US012773300B2

(12) United States Patent
Fischler

(10) Patent No.: US 12,773,300 B2
(45) Date of Patent: Oct. 27, 2026

(54) DENTAL CONNECTION ASSEMBLY, DENTAL REPLACEMENT PART KIT AND INTERMEDIATE INSERT

(71) Applicant: INSTITUT STRAUMANN AG, Basel (CH)

(72) Inventor: Felix Fischler, Hagenthal-le-Haut (FR)

(73) Assignee: INSTITUT STRAUMANN AG, Basel (CH)

( * ) Notice: Subject to any disclaimer, the term of this patent is extended or adjusted under 35 U.S.C. 154(b) by 338 days.

(21) Appl. No.: 18/041,610

(22) PCT Filed: Aug. 18, 2021

(86) PCT No.: PCT/EP2021/072962

§ 371 (c)(1),
(2) Date: Feb. 14, 2023

(87) PCT Pub. No.: WO2022/038195

PCT Pub. Date: Feb. 24, 2022

(65) Prior Publication Data

US 2023/0346523 A1 Nov. 2, 2023

(30) Foreign Application Priority Data

Aug. 18, 2020 (CH) .................................... 01033/20

(51) Int. Cl.
*A61C 8/00* (2006.01)

(52) U.S. Cl.
CPC .......... *A61C 8/0068* (2013.01); *A61C 8/0063* (2013.01); *A61C 8/0095* (2013.01)

(58) Field of Classification Search
CPC .... A61C 8/0068; A61C 8/0063; A61C 8/0095
(Continued)

(56) References Cited

U.S. PATENT DOCUMENTS 5,556,280 A * 9/1996 Pelak .................. A61C 8/0048 433/172
6,217,331 B1 * 4/2001 Rogers ................ A61C 8/0065 433/173

(Continued)

FOREIGN PATENT DOCUMENTS

EP 2489326 A2 8/2012
EP 3818959 A1 * 5/2021 ........... A61C 8/0062
KR 102568819 B1 * 8/2023 ............... A61C 5/70

*Primary Examiner* — Matthew M Nelson
(74) *Attorney, Agent, or Firm* — Dority & Manning, P.A.

(57) ABSTRACT

A dental connection assembly for connecting an artificial denture to a jaw comprises a retention insert, an abutment structure, a fixation screw and an intermediate insert. The retention insert has a retention end portion and a retention skirt portion forming a retention cavity. The retention insert and the abutment structure are configured to be snap-fit connected by the retention cavity of the retention insert receiving a male member of the abutment structure. The abutment structure has a screw socket which opens at the male member and which corresponds to the fixation screw such that the fixation screw is axially movable into the screw socket by screwing the fixation screw into the screw socket. An intermediate skirt portion of the intermediate insert forms a female recess dimensioned to receive the male member. A flange portion of the intermediate skirt outwardly extends from a second axial end of the intermediate skirt portion.

23 Claims, 7 Drawing Sheets

(58) Field of Classification Search
USPC .......................................................... 433/173
See application file for complete search history.

(56) References Cited

U.S. PATENT DOCUMENTS

| | | | | |
|---|---|---|---|---|
| 6,299,447 | B1 * | 10/2001 | Zuest | A61C 8/005 433/172 |
| 9,456,881 | B1 * | 10/2016 | Niznick | A61C 8/0053 |
| 2002/0076673 | A1 * | 6/2002 | Wagner | A61C 8/005 433/172 |
| 2002/0160334 | A1 * | 10/2002 | Brodbeck | A61C 8/0063 433/173 |
| 2006/0099549 | A1 * | 5/2006 | Engman | A61C 8/0065 433/173 |
| 2010/0055645 | A1 * | 3/2010 | Mullaly | A61C 8/0075 433/215 |
| 2012/0214128 | A1 * | 8/2012 | Collins | A61L 27/047 433/173 |
| 2015/0297322 | A1 * | 10/2015 | Fischler | A61C 13/2656 433/177 |
| 2016/0022387 | A1 * | 1/2016 | Allen | A61C 3/168 433/172 |
| 2016/0143710 | A1 * | 5/2016 | Allen | A61C 3/168 433/172 |
| 2017/0202649 | A1 * | 7/2017 | Bernhard | A61C 8/0066 |
| 2018/0049849 | A1 * | 2/2018 | Lamar | A61C 8/001 |
| 2018/0263737 | A1 * | 9/2018 | Simmonds | A61C 13/34 |
| 2019/0175307 | A1 * | 6/2019 | Agliati | A61C 8/0095 |
| 2019/0374313 | A1 * | 12/2019 | Lazarof | A61C 8/0071 |
| 2020/0107914 | A1 * | 4/2020 | Kofford | A61C 8/0078 |
| 2020/0253699 | A1 * | 8/2020 | Dahiya | A61C 8/0048 |
| 2022/0211471 | A1 * | 7/2022 | De Andres Zurbano | A61C 8/0068 |
| 2022/0273402 | A1 * | 9/2022 | Ha | A61C 8/0016 |

* cited by examiner

DENTAL CONNECTION ASSEMBLY, DENTAL REPLACEMENT PART KIT AND INTERMEDIATE INSERT

CROSS-REFERENCE TO RELATED APPLICATIONS

The present application is a US national phase application of International Patent Application No. PCT/EP2021/072962, filed Aug. 18, 2021, which, in turn, is based upon and claims the right of priority to Switzerland Patent Application No. 01033/20, filed Aug. 18, 2020, the disclosures of both of which are hereby incorporated by reference herein in their entirety for all purposes.

TECHNICAL FIELD

The present invention relates to a dental connection assembly according to the preamble of independent claim 1 and more particularly to a dental replacement part kit and an intermediate insert.

Such dental connection assemblies comprising a retention insert and an abutment structure, wherein the abutment structure has a male member, the retention insert has a retention end portion and a retention skirt portion together forming a retention cavity, the retention insert and the abutment structure are configured to be snap-fit connected by the retention cavity of the retention insert receiving the male member of the abutment structure, and the retention end portion of the retention insert defines a retention height by which the retention insert extends from the abutment structure, when the retention insert is snap-fit connected to the abutment structure, can be used for detachably connecting an artificial denture to a jaw.

BACKGROUND ART

In dentistry, it is known to replace damaged or diseased teeth of a patient by an artificial denture. In order to mount the denture, one or more implants are inserted as root replacements into jaw bones of the patient. Typically, on each implant an abutment is then fitted partially, wherein the implant itself, or the longitudinal end of the abutment directed away from the implant, is designed with a connecting structure, via which the artificial denture can be mounted to the jaw.

In widely used configurations connecting arrangements are designed as press-fit connections, wherein typically a male part of the press-fit connection is formed on the abutment or implant, and a female part of the press-fit connection is connected to the prosthesis structure. Particularly, when large portions of the natural denture or even full natural dentures have to be replaced, such connecting arrangements are used to connect an artificial denture to a plurality of abutments or implants. For example, to replace a full denture of a lower or an upper jaw four implants with or without abutments are set to which the artificial denture is mounted.

To replace plural teeth such as a full denture of a jaw by one artificial denture, hybrid dentures are known which can be mounted and demounted by the patient himself. In particular, such hybrid dentures can be removed, e.g. during night time, for cleaning the denture and the mouth.

For example, WO 2010/025034 A1 describes a dental anchoring device in the context of hybrid dentures. The dental anchoring device comprises a male head, formed on the abutment or directly on the implant, and a matrix with a housing, which is securely connected to the artificial denture or prosthesis. The matrix moreover comprises a retention insert, which is fitted into the housing before the matrix is snap-fitted, together with the prosthesis structure, onto the male head. The male head has a flat head end, and an outer surface curving outward in a convex shape and acting as a snap-fit surface. In the flat head end, an opening with an inner profile is let into the male head, through which opening, on the one hand, a screwing tool can engage for screwing the abutment or the implant and, on the other hand, a punch or stopper can clamp the retention insert.

Another press-fit connection system in the context with hybrid dentures is described in WO 2011/027229 A2. Here, the matrix is refined, inter alia, such that the retention insert is securely connected to the housing via a locking mechanism when the matrix is snap-fitted onto the male head. Moreover, the retention insert has a retention edge with several lamellae for ensuring an elasticity sufficient to snap-fit onto the male head and for compensating for uneven forces acting on the matrix, for example during chewing movements. The shape of the lamellae of the retention edge can also determine the pulling-off or holding force of the retention insert and, therefore, of a prosthesis structure connected to it.

As alternative to the hybrid dentures mentioned above, non-removable artificial dentures are known. Such artificial dentures are typically fixed to the abutment or implants set in the jaw of the patient by a dentist screwing it into the abutments, implants or a bridge mounted on the implants.

Both types of artificial dentures have upsides and downsides. Whereas hybrid dentures bear the risk to be unintentionally at least partially detached, e.g. when comparably high biting forces are provided, non-removable artificial dentures are fixed and may provide a higher stability. Therefore, some patients prefer non-removable artificial dentures to increase the comfort in use, particularly when chewing.

On the other hand, whereas hybrid dentures allow for a comparably comfortable regular cleaning of the jaw after removal of the denture or prosthesis, hygiene typically is more complicated when non-removable artificial dentures are involved. Usually, non-removable artificial dentures are fixed to the jaws such that a gap or slot is provided between artificial denture or prosthesis and soft tissue of the jaw. This gap allows a brush or other cleaning tool to access the jaw for cleaning. On the other side, such gaps may cause discomfort to the patients as they may be visible, for example when laughing.

With the known artificial dentures, patients typically have to decide in advance with which downside they likely may better get along. However, frequently this decision is regretted and the patients would like to change from hybrid dentures to non-removable artificial dentures or vice-versa. Such changes involve mayor remodeling of the dentures, if possible at all. For example, changing from non-removable artificial dentures to hybrid dentures usually involves, replacing the screw-fit abutments in the jaw by abutments having a snap-fit male head, fixing housings of the female part of the snap-fit structure to the artificial denture, and attaching or forming a skirt portion to the artificial denture which passes over to the soft tissue of the jaw in order to prevent the gap mentioned above.

Thus, with known techniques it typically is comparably complicated or even impossible to change between a hybrid denture and a non-removable artificial denture without modeling two distinct dentures or prosthesis. Therefore, such change often is comparably costly such that the dentures are not changed even when possible. The patients have then to live with the downside and discomfort of the chosen dentures solution which may essentially lower the quality of life and, more specifically, the oral health-related quality of life (OHRQL).

Therefore, there is a need for a system allowing to comparably easily and efficiently adapt an artificial denture from hybrid denture to non-removable artificial denture, or vice versa.

DISCLOSURE OF THE INVENTION

According to the invention this need is settled by a dental connection assembly, a dental replacement part kit, and an intermediate insert as defined by the independent claims. Preferred embodiments are subject of the dependent claims.

In one aspect, the invention is dental connection assembly for connecting an artificial denture to a jaw. The dental connection assembly comprises a retention insert, an abutment structure with a male member, a fixation screw and an intermediate insert.

The term "jaw" in the context of the invention relates to a complete upper or lower jaw including hard tissue such as the jaw bone and soft tissue such as the gingiva.

The retention insert has a retention end portion and a retention skirt portion together forming a retention cavity. The retention insert typically is a one-piece or monolithic structure or element. It can be made of a biocompatible plastic material providing for an appropriate elasticity and rigidity. For example, a polyether ether ketone (PEEK) or a similar material is a suitable material to be used.

The retention insert and the abutment structure are configured to be snap-fit connected by the retention cavity of the retention insert receiving the male member of the abutment structure. The term "snap-fit" in this connection relates to a reversible form fit connection. In particular, a snap-fit connection may be provided be two elements, wherein at least one of the is temporarily deformed and then elastically moves back to its original position where the two elements form fit. For example, a snap-fit connection can be achieved in a push-button or press fastening like connection. Advantageously, the retention insert is snap-fit connected to the male member by linearly being moved onto it such that the retention skirt elastically surrounds the male member. For allowing an efficient snap-fit connection the male member may be equipped with a head portion and a neck portion, wherein the retention cavity is shaped in correspondence with the head portion of the male member.

The abutment structure has a screw socket which opens at the male member and which corresponds to the fixation screw such that the fixation screw is axially movable into the screw socket by screwing the fixation screw into the screw socket.

The intermediate insert has an intermediate skirt portion and a flange portion. The intermediate skirt portion of the intermediate insert forms a female recess dimensioned to receive the male member of the abutment structure. Thereby, receiving the male member can be achieved by either arranging the complete male member in the retention cavity or a portion thereof such as its head portion.

Advantageously, the intermediate insert is arranged to loosely accommodate the male member of the abutment structure. In other words, the intermediate insert does not comprise a retention means for snap fitting or clamping the intermediate insert to the male member of the abutment structure.

The intermediate skirt portion of the intermediate insert has a first axial end and a second axial end. The axial ends of the intermediate skirt portion can be the ends in the direction along the axis defined by the screw socket, i.e. the main axis as described below, when the female recess receives the male member. The flange portion outwardly extends from the second axial end of the intermediate skirt portion. The intermediate insert typically is a one-piece or monolithic structure. However, its flange portion can also be provided with a sealing ring or washer.

Preferably the second axial end is the end through which, in use, the male member is inserted into the retention cavity The term "artificial denture" as used herein relates to any structure built or designed for replacing a natural denture of a patient. Thereby, it particularly relates to a replacement of a plurality of teeth of an upper or lower jaw such as the full natural denture of the jaw or a comparably large section thereof. Typically, artificial dentures involve artificial teeth, an artificial soft tissue section and at least a part of a connection structure by which a mounting or fixation to implants set in the jaw is possible. The connection structure is in general designed either for a detachable connection to the jaw or for a fixed connection to the jaw. The artificial denture may be or involve a dental prosthesis. The artificial denture can particularly be designed to be fixed or mounted to the jaw via a plurality of implants.

The term "abutment structure" can relate to or involve an abutment in a narrower sense, i.e. a constructive element to be fixed to an implant set into a jaw. Or, it can relate to an integral portion of the implant providing a connection structure. Or, it can relate to a portion of a structure mounted to a capped tooth or the like.

The abutment structure can be made of titanium and may be coated with a Diamond like Carbon (DLC) or a titanium nitride layer. It could also be made of a ceramic material used in dental implantology and prosthodontics.

The term "male member" in this connection can relate to a patrice structure of the abutment structure to which the denture is connected. In particular, the male member can comprise a head to be locked or mounted in the retention cavity of the retention insert which in turn is mounted in the artificial denture.

The head of the male member can be spherical or conical or the like. In an advantageous embodiment the head or male member is embodied for a push-button like connection with the retention insert. Thereby, the male member can comprise a neck portion typically having a narrower diameter than the head, on which the head is positioned. Thereby, the head can radially project over the neck portion. More specifically, the head can have two lateral or radial ends of a rounded shape. The rounded shape allows that the head laterally protrudes the neck portion in a bulge-like manner. The end opposite to the neck portion may be essentially flat. Like this, a comparably compact head suitable for being snap-fitted to the retention insert can be provided.

The retention insert receiving the male member of the abutment structure can be established by arranging the more or less complete male member or a portion thereof inside the retention cavity. In any case, the male member has to be arranged in the retention cavity to a sufficient extent such that the retention insert is snap-fitted to the male member.

Analogously, the intermediate insert receiving the male member of the abutment structure can also be established by arranging the more or less complete male member or a portion thereof inside the female recess. In contrast to the retention insert however, the intermediate insert is usually not arranged to be snap fitted to the male member. Thereby, the male member typically is loosely arranged in the female recess such that the intermediate insert is not directly connected to the male member.

The abutment structure or its screw socket can define an axis, wherein such axis can be an axis of rotation about which the fixation screw is rotated when being screwed into the screw socket of the abutment structure. More specifically, the screw socket of the abutment structure preferably has a main axis about which the fixation screw is rotated when being screwed into the screw socket of the abutment structure. The intermediate insert can be rotationally symmetric about the main axis.

The main axis can be defined as the axis the fixation screw rotates about. It can also be the axis of the implant or abutment structure. The terms “axial”, “axially”, “along the main axis” or the like in relation to dental connection assembly parts or portions thereof other than the fixation screw such as the intermediate insert, the retention insert, the housing, the screw socket or the like may refer to the main axis. In the absence of the fixation screw, the main axis still may exist defined by the position where the fixation screw is intended to be. The main axis may usually extend along the insertion path of the respective dental connection assembly part.

By providing the retention insert and the intermediate insert, the dental connection assembly allows for interchangeably connecting the artificial denture to the jaw in a fixed manner (non-removable artificial denture) when using the intermediate insert or in a detachable manner (hybrid denture) when using the retention insert. Thereby, the intermediate insert and particularly its flange portion can fill a space between the artificial denture and/or a part of the dental connection assembly, which space is necessary when the retention insert is used in order to allow a sufficient movement of the artificial denture relative to the abutment structure. Like this, the flange portion of the intermediate insert can close the space between the artificial denture and the abutment structure such that deposition of undesired substances in this space can be prevented.

Furthermore, by means of the flange portion the artificial denture can be supported and stabilized to the abutment structure. Supported in this context can relate to absorbing forces acting on the artificial denture and transmitted to the flange portion of the intermediate insert. In order to ensure the transfer of forces, it can be of importance that the artificial denture or a housing as described below and the outer surface of the intermediate skirt portion, e.g. the surface facing towards the artificial denture or housing, do not interfere with the transfer of forces. For being capable of resisting the mentioned forces the intermediate insert or at least its flange portion, advantageously is made of a comparably firm material like titanium or PEEK or a similar biocompatible material. Using PEEK as the material of the intermediate insert allows to colour or dye the intermediate insert at least in the region of the flange portion or at a circumference facing towards the artificial denture with a colour that corresponds to the colour of the artificial denture to make the gap between jaw and artificial denture less visible.

Thus, the dental connection assembly according to the invention allows for preventing an essential or extensive adaptation or redesign of the artificial denture to change between the fixed and detachable connections. Rather, the dental connection assembly according to the invention allows to efficiently and comparably easily rearrange the artificial denture to change between a hybrid denture and a non-removable artificial denture, or vice versa.

The dental connection assembly further allows particularly beneficial applications or advantageous replacing of natural teeth by an artificial denture. For example, in order to allow an immediate usage of the artificial denture the dental connection assembly may be applied by being in its non-removable configuration first such that the artificial denture is fixedly anchored. Then after complete healing of the implants, the dental connection assembly can be adapted or changed to its hybrid denture configuration such that it can be removed when desired.

Preferably, the intermediate insert is configured such that the flange portion abuts the abutment structure, when the female recess receives the male member of the abutment structure. In particular, the abutment structure preferably has a shoulder portion and the flange portion of the intermediate insert abuts the shoulder portion of the abutment structure, when the female recess receives the male member of the abutment structure. Advantageously, the male member extends in an axial direction from the shoulder portion and, particularly, along the main axis. The shoulder portion can be or comprise an essentially flat surface. The flat surface of the shoulder portion can be aligned in an essentially orthogonal manner with respect to the main axis. Such surface can receive the artificial denture or the flange portion of the intermediate insert to support the artificial denture.

By abutting the abutment structure or its shoulder portion the flange portion allows for providing a closure towards the abutment structure. Thereby, the flange portion can additionally abut the artificial denture such that a gap between the artificial denture and the abutments structure can be closed. To generate a sufficient tightness or efficient closure, advantageously the flange portion is clamped in between the artificial denture and the abutment structure. Such closing allows for preventing that any undesired substance such as particles of different kinds and sizes like food residues may enter the gap such that the hygienic conditions may be improved.

Preferably, the dental connection assembly comprises a housing with a housing cavity, wherein the housing is configured to be fixed to the artificial denture and the housing cavity is configured to receive either the retention insert or the intermediate insert. Fixing the housing to the artificial denture can be established by integrating the housing into the denture. Therefore, an outer boundary of the housing can be equipped with a shape allowing a fix jointure of the artificial denture and the housing. Such housing allows for efficiently providing the housing cavity into which the retention insert can be received.

Thereby, the retention insert and the housing cavity of the housing preferably are configured such that the retention insert is locked in the housing cavity when the housing cavity of the housing receives the retention insert and the retention cavity of the retention insert receives the male member of the abutment structure, and the retention insert is reversibly held in the housing cavity when the housing cavity of the housing receives the retention insert and the retention cavity of the retention insert does not receive the male member of the abutment structure the retention insert. In particular, the housing cavity together with the retention insert can be designed to allow a variable holding and locking of the retention insert in the housing depending on the retention insert being mounted to the male member or not. Such arrangement allows for an efficient removal of the retention insert when not being mounted to the male member and solid connection between housing and retention insert when the retention insert is mounted to the male member.

Preferably, the housing has a through hole and a seat, and the fixation screw is arrangeable through the through hole of the housing such that a head of the fixation screw is received in the seat of the housing. Such design allows for efficiently and securely fixing the housing together with the artificial denture to the abutment structure. Like this, the housing particularly together with the artificial denture can efficiently be fixed to the abutment structure by means of the fixation screw. More specifically, for being fixed to the abutment structure, the intermediate insert is positioned in the housing cavity and receives the male member of the abutment structure. The fixation screw is then forwarded through the through hole of the housing and of the opening intermediate insert into the screw socket of the abutment structure. By screwing the fixation screw into the screw socket, the head of the fixation screw is forced into the seat of the housing which presses the housing together with the artificial denture against the abutment structure.

Preferably, the intermediate insert, the abutment structure and the housing are configured such that the flange portion of the intermediate insert is clamped between the housing and the abutment structure, when the housing cavity of the housing receives the intermediate insert, when the fixation screw is screwed into the screw socket of the abutment structure and when the head of the fixation screw is received in the seat of the housing. Such configuration allows for efficiently sealing a gap between the housing or artificial denture and abutment structure when the artificial denture is connected to the jaw in a fixed manner (non-removable artificial denture). In particular, by dimensioning the flange portion to be clamped in between the housing and the abutment structure a particularly tight closing can be achieved.

Preferably, the retention insert, the abutment structure and the housing are configured to form a gap between the housing and the abutment structure, when the housing cavity of the housing receives the retention insert and the retention cavity of the retention insert receives the male member of the abutment structure. Such gap allows for connecting the artificial denture to the jaw in a detachable manner (hybrid denture). In particular, such gap allows for efficient snap-fit connecting the artificial denture and for providing an appropriate movement of the artificial denture relative to the abutment structure.

Thereby, the flange portion of the intermediate insert preferably is configured to fill the gap between the housing and the abutment structure, when the housing cavity of the housing receives the intermediate insert and the female recess of the intermediate insert receives the male member of the abutment structure. Like this, the intermediate insert and the retention insert are in correspondence with each other and the dental connection assembly can efficiently be used in a fixed manner and in a detachable manner.

Preferably, the intermediate insert has an intermediate end portion arranged at the first axial end of the intermediate skirt portion. Thereby, the intermediate end portion of the intermediate insert preferably at least partially covers the first axial end of the intermediate skirt portion of the intermediate insert. Such intermediate end portion allows generating the female recess together with the intermediate skirt in the form of a cavity. This allows for a particularly efficient mounting or positioning of the intermediate insert on the male member of the abutment structure. Also, the intermediate end portion may help to conveniently position the intermediate insert on the male member. In particular, the female recess can efficiently be embodied to partially surround the male member such that it can be stably received in the female recess.

Thereby, the intermediate end portion of the intermediate insert preferably has an opening to access the female recess through the intermediate end portion such that the screw socket of the abutment structure is accessible to the fixation screw through the opening of the intermediate end portion of the intermediate insert, when the male member of the abutment structure is received in the female recess of the intermediate insert. The opening can particularly be a bore extending through the intermediate end portion. Such opening in the end portion of the intermediate insert allows an efficient provision of the fixing screw into the screw socket. Like this, the denture can be efficiently screwed and fixed to the jaw when the intermediate insert is positioned on the male member of the abutments structure.

Preferably, the flange portion of the intermediate insert radially extends from the intermediate skirt portion of the intermediate insert. Such radial extension can particularly relate to projecting from the mentioned axis in an essentially orthogonal manner. Such flange portion allows for being efficiently positioned between abutment structure and artificial denture.

The intermediate skirt portion preferably has an inner boundary radially limiting the female recess, wherein the inner boundary tapers from the second axial end towards the first axial end. In particular, at least a portion of the female recess can have a shape of a cone or a truncated cone. By tapering from the second axial end towards the first axial end, i.e. by axially tapering, the male member can conveniently be arranged inside the female recess.

In one preferred embodiment, the male member of the abutment structure comprises a swivel protection projection, wherein the retention cavity of the retention insert is shaped to receive the male member of the abutment structure including the swivel protection projection. The swivel protection projection can particularly project from the male member in an axial direction or in a direction of the main axis. The swivel protection projection can, e.g. have the shape of a hollow cylinder and more specifically a hollow truncated cone cylinder or the like. It can particularly provide a surface abutting a corresponding surface of the retention cavity for limiting a swivelling of the retention insert.

The term "swivel" used herein in connection with the retention insert and the abutment structure can relate to a rotational or tilting movement relative to the male member different from a rotation about the main axis. In particular, whereas a rotation of the retention insert about the main axis may still be possible, the swivel protection projection prevents or at least essentially reduces an extent of swivelling the retention inset on the male member.

In another preferred embodiment, the dental connection assembly comprises a swivel protection screw having a head and being configured to be screwed into the screw socket of the abutment structure such that the head of the swivel protection screw projects from the male member, wherein the retention cavity of the retention insert is shaped to receive the male member of the abutment structure together with the head of the swivel protection screw, when the swivel protection screw is screwed into the screw socket of the abutment structure. The head can particularly project from male member in an axial direction. It can have the shape of a solid cylinder and, specifically, a solid truncated cone cylinder or the like. It can particularly provide a surface abutting a corresponding surface of the retention cavity for limiting a swivelling of the retention insert.

Even though the swivel protection screw is mentioned here in connection with the dental connection assembly according to the invention, it is to note that such screw can also be used in other hybrid dentures. In particular, it can be used in hybrid dentures which are not intended to be changed to non-removable dentures in accordance with the invention.

Viewed from another aspect therefore, the present invention provides a dental connection assembly for connecting an artificial denture to a jaw, comprising a retention insert and an abutment structure, wherein the abutment structure has a male member and a screw socket which opens at the male member, and the retention insert has a retention end portion and a retention skirt portion together forming a retention cavity, the retention insert and the abutment structure being configured to be snap-fit connected by the retention cavity of the retention insert receiving the male member of the abutment structure, the dental connection assembly further comprising a swivel protection screw having a head and being configured to be screwed into the screw socket of the abutment structure such that the head of the swivel protection screw projects from the male member, wherein the retention cavity of the retention insert is shaped to receive the male member of the abutment structure together with the head of the swivel protection screw, when the swivel protection screw is screwed into the screw socket of the abutment structure, the head of the swivel protection screw providing a surface abutting a corresponding surface of the retention cavity for limiting or preferably preventing a swivelling of the retention insert.

Preferred features of the retention insert, abutment structure and swivel protection screw mentioned above and below are equally valid in respect of both the first and second aspects of the invention.

By reducing or preventing swivelling of the artificial denture relative to the abutment structure, it can be prevented that the artificial denture unintentionally is released from the abutment structure. This allows increasing the comfort when wearing the artificial denture. Further, it allows that the gap between the abutment structure and the artificial denture is comparably small. In fact, the dimension of the gap typically correlates to a potential swivel movement caused by forces acting on the artificial denture and/or the housing, respectively, e.g. by chewing. The gap has to compensate movements of the artificial denture caused by these forces.

Preferably, the retention cavity of the retention insert together with the swivel protection projection of the male member of the abutment structure or together with the head of the swivel protection screw are configured such that swivelling of the retention insert is prevented, when the male member of the abutment structure is received in the retention cavity of the retention insert.

In another aspect, the invention is a dental replacement part kit of a dental connection assembly for connecting an artificial denture to a jaw, comprising a retention insert and an intermediate insert such as the dental connection assembly according to the invention or any of its preferred embodiments described above. The retention insert has a retention end portion and a retention skirt portion together forming a retention cavity. The retention insert is configured to be snap-fit connected to an abutment structure, which has a male member and a screw socket which opens at the male member and which corresponds to a fixation screw such that the fixation screw is axially movable into the screw socket by screwing the fixation screw into the screw socket, by the retention cavity of the retention insert receiving the male member of the abutment structure. The intermediate insert has an intermediate skirt portion and a flange portion.

The intermediate skirt portion of the intermediate insert forms a female recess dimensioned to receive the male member of the abutment structure. The intermediate skirt portion of the intermediate insert has a first axial end and a second axial end. The flange portion of the intermediate insert outwardly extends from the second axial end of the intermediate skirt portion of the intermediate insert.

The dental replacement part kit and its preferred embodiments described below allow for achieving the effects and benefits described in connection with the dental connection assembly according to the invention and its preferred embodiments described above.

Preferably, the intermediate insert has an intermediate end portion arranged at the first axial end of the intermediate skirt portion.

Thereby, the intermediate end portion of the intermediate insert preferably has an opening to access the female recess through the intermediate end portion such that the screw socket of the abutment structure is accessible to the fixation screw through the opening of the intermediate end portion of the intermediate insert, when the male member of the abutment structure is received in the female recess of the intermediate insert.

The intermediate end portion of the intermediate insert preferably at least partially covers the first axial end of the intermediate skirt portion of the intermediate insert.

Preferably, the flange portion of the intermediate insert radially extends from the intermediate skirt portion of the intermediate insert.

Preferably, the intermediate skirt portion of the intermediate insert has an inner boundary radially limiting the female recess, wherein the inner boundary tapers from the second axial end of the intermediate skirt portion of the intermediate insert towards the first axial end of the intermediate skirt portion of the intermediate insert.

Preferably, the retention cavity of the retention insert is configured together with a swivel protection projection of the male member of the abutment structure such that swivelling of the retention insert is prevented, when the male member of the abutment structure is received in the retention cavity of the retention insert.

In a further other aspect, the invention is intermediate insert of a dental connection assembly for connecting an artificial denture to a jaw such as the dental connection assembly according to the invention or any of its preferred embodiments described above. The intermediate insert comprises an intermediate skirt portion and a flange portion. The intermediate skirt portion together forming a female recess. The intermediate skirt portion has a first axial end and a second axial end. The flange portion is arranged at the second axial end of the intermediate skirt portion. The flange portion outwardly extends from the second axial end of the intermediate skirt portion.

The intermediate insert according to the invention and its preferred embodiments described below allow for achieving the effects and benefits described in connection with the dental connection assembly according to the invention and its preferred embodiments described above.

Preferably, the intermediate insert comprises an intermediate end portion arranged at the first axial end of the intermediate skirt portion.

Preferably, the intermediate end portion has an opening to access the female recess through the intermediate end portion.

Preferably, the intermediate end portion at least partially covers the first axial end of the intermediate skirt portion.

Preferably, the flange portion of the intermediate insert radially extends from the intermediate skirt portion.

Preferably, the intermediate skirt portion has an inner boundary radially limiting the female cavity, wherein the inner boundary tapers from the second axial end towards the first axial end.

In still another further aspect, the invention is dental connection assembly for connecting an artificial denture to a jaw, comprising a retention insert and an abutment structure. The abutment structure has a male member. The retention insert has a retention end portion and a retention skirt portion together forming a retention cavity. The retention insert and the abutment structure are configured to be snap-fit connected by the retention cavity of the retention insert receiving the male member of the abutment structure. The retention end portion of the retention insert defines a retention height by which the retention insert extends from the abutment structure, when the retention insert is snap-fit connected to the abutment structure.

The dental connection assembly further comprises a fixation screw and an intermediate insert. The abutment structure has a screw socket which opens at the male member and which corresponds to the fixation screw such that the fixation screw is axially movable into the screw socket by screwing the fixation screw into the screw socket. The intermediate insert has an intermediate end portion and an intermediate skirt portion together forming a female cavity dimensioned to receive the male member of the abutment structure. It further comprises a flange portion. The intermediate skirt portion has a first axial end and a second axial end. The intermediate end portion is arranged at the first axial end of the intermediate skirt portion. The flange portion is arranged at the second axial end of the intermediate skirt portion. The flange portion outwardly extends from the second axial end of the intermediate skirt portion.

This embodiment of the dental connection assembly according to the invention allows for achieving the effects and benefits described in connection with the dental connection assembly according to the invention and its preferred embodiments described above. In preferred embodiments, the intermediate insert is provided with the features of the preferred embodiments of the intermediate insert described above.

BRIEF DESCRIPTION OF THE DRAWINGS

The dental connection assembly according to the invention, the replacement part kit and the intermediate insert according to the invention are described in more detail herein below by way of exemplary embodiments and with reference to the attached drawings, in which.

DESCRIPTION OF EMBODIMENTS

In the following description certain terms are used for reasons of convenience and are not intended to limit the invention. The terms “right”, “left”, “up”, “down”, “under” and “above” refer to directions in the figures. The terminology comprises the explicitly mentioned terms as well as their derivations and terms with a similar meaning. Also, spatially relative terms, such as “beneath”, “below”, “lower”, “above”, “upper”, “proximal”, “distal”, and the like, may be used to describe one element’s or feature’s relationship to another element or feature as illustrated in the figures. These spatially relative terms are intended to encompass different positions and orientations of the devices in use or operation in addition to the position and orientation shown in the figures. For example, if a device in the figures is turned over, elements described as “below” or “beneath” other elements or features would then be “above” or “over” the other elements or features. Thus, the exemplary term “below” can encompass both positions and orientations of above and below. The devices may be otherwise oriented (rotated 90 degrees or at other orientations), and the spatially relative descriptors used herein interpreted accordingly. Likewise, descriptions of movement along and around various axes include various special device positions and orientations.

To avoid repetition in the figures and the descriptions of the various aspects and illustrative embodiments, it should be understood that many features are common to many aspects and embodiments. Omission of an aspect from a description or figure does not imply that the aspect is missing from embodiments that incorporate that aspect. Instead, the aspect may have been omitted for clarity and to avoid prolix description. In this context, the following applies to the rest of this description: If, in order to clarify the drawings, a figure contains reference signs which are not explained in the directly associated part of the description, then it is referred to previous or following description sections. Further, for reason of lucidity, if in a drawing not all features of a part are provided with reference signs it is referred to other drawings showing the same part. Like numbers in two or more figures represent the same or similar elements.

Figure 1:
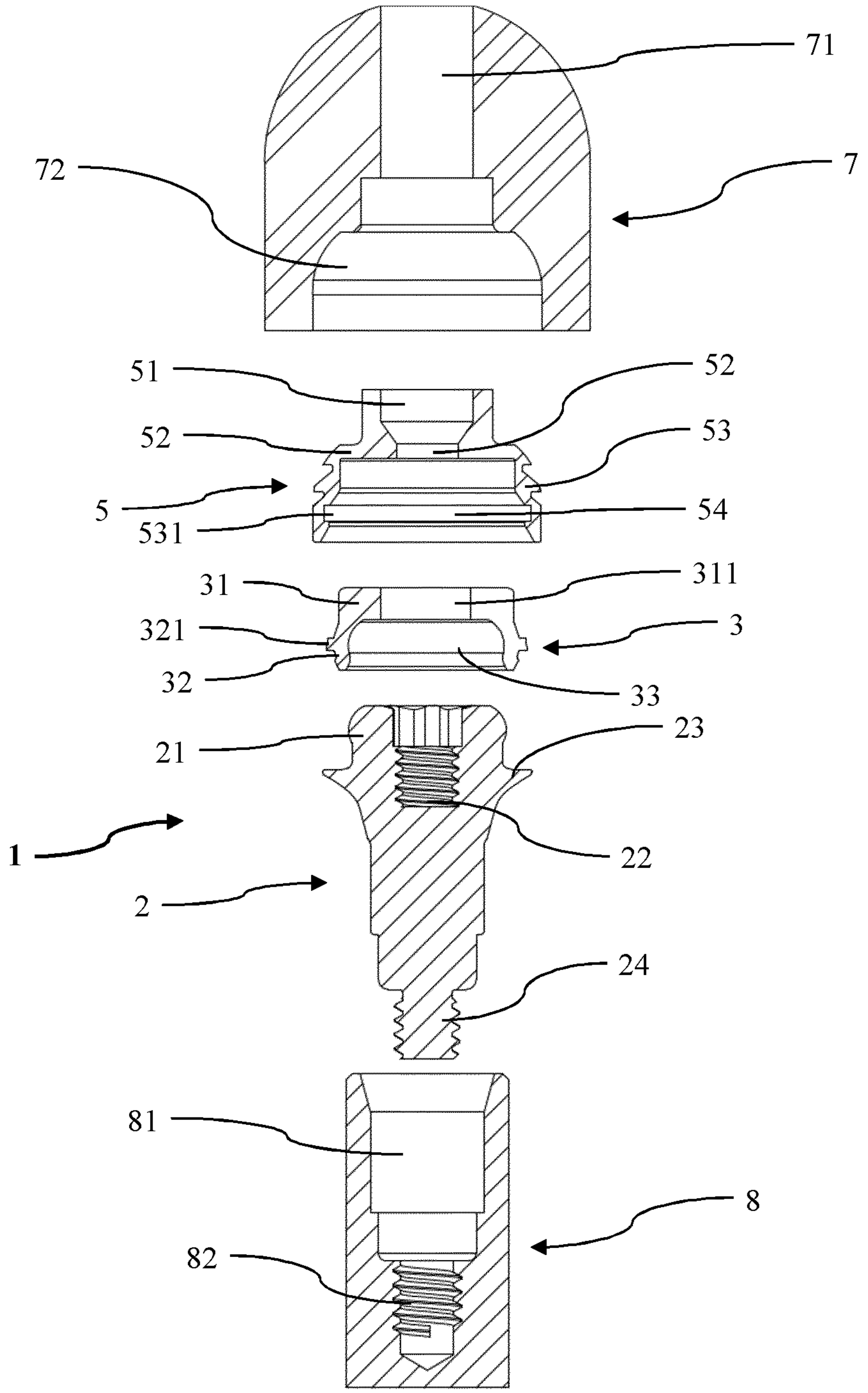
FIG. 1 shows a cross-sectional exploded view of a first embodiment of the dental connection assembly according to the invention comprising a first embodiment of a replacement part kit according to the invention comprising a first embodiment of an intermediate insert according to the invention, wherein the dental connection assembly is in a hybrid denture composition.

FIG. 1 shows a first embodiment of a dental connection assembly 1 according to the invention comprising an abutment 2 as abutment structure, a retention insert 3 as part of a first embodiment of a dental replacement part kit according to the invention and a housing 5. FIG. 1 shows the dental connection assembly 1 in use together with an artificial denture 7 and an implant 8.

The artificial denture 7 is a full prosthesis of natural teeth of an upper or a lower jaw of a patient. In FIG. 1 it is schematically depicted as a body having an axial bore 71 passing over into a denture cavity 72 for receiving the dental connection assembly 1. Even though in the FIGS. one single denture cavity 72 is shown, typically, full prostheses are equipped with plural denture cavities 72 corresponding to plural implants 8 set into the jaw. The implant 8 comprises an abutment seat 81 opening at a top end of the implant 8 and downwardly passing over into an abutment screw socket 82 equipped with an inner thread.

The abutment 2 is designed to be fixed to the implant 8. It has a male member 21, a screw socket 22, a shoulder portion 23 and a lower screw post 24. The screw socket 22 provides an axial hole along a main axis 11 (see FIG. 2) of the dental connection assembly 1 and is equipped with an inner thread. The screw socket 22 opens at an upper end of the male member 21. The screw post 24 is equipped with an outer thread corresponding to the inner thread of the abutment screw socket 82 of the implant 8.

The shoulder portion 23 of the abutment comprises an essentially flat horizontal top surface. More specifically, the shoulder portion 23 radially extends. The male member 21 has a neck portion upwardly extending from the shoulder portion 23. The neck portion upwardly passes over into a head portion of the male member 21. The head portion has a bent outer surface laterally or radially projecting over the neck portion. A top end of the head portion is essentially flat. Such male member 21 allows for an efficient snap-fit connection in a comparably compact configuration. The shoulder portion 23 laterally or radially projects beyond the male member 21.

The retention insert 3 is made of PEEK and comprises a retention end portion 31 as well as a retention skirt portion 32 together forming a retention cavity 33. The retention end portion 31 is equipped with an opening 311 and the retention skirt portion 32 comprises an axial slit extending to the opening, both of them facilitating the generation of a spring like effect to snap-fit connect the retention insert 3 to the male member 21. The retention skirt portion 32 comprises an outwardly or radially extending retention rim 321 that forms a radial projection.

The housing 5 comprises an upwardly opening seat 51, a downwardly opening housing cavity 54, a through hole 52 between the seat 51 and the housing cavity 54, a housing end portion 55 and a housing skirt 53. The housing skirt 53 and the housing end portion 55 on their inner side, i.e. the side that faces the retention insert 3 when being assembled, forms the housing cavity 54 that is designed to receive the retention insert 3. Further, the housing skirt portion 53 has a notch 531 circumferentially extending about the housing cavity 54. On its lateral periphery, i.e. the side of the housing skirt 53 that faces the artificial denture 7 when being assembled, the housing skirt 53 provides undercut structures in the form of, e.g., radial projections that built retention means for firm connection to the artificial denture 7. The housing 5 is made of titanium.

Figure 2:
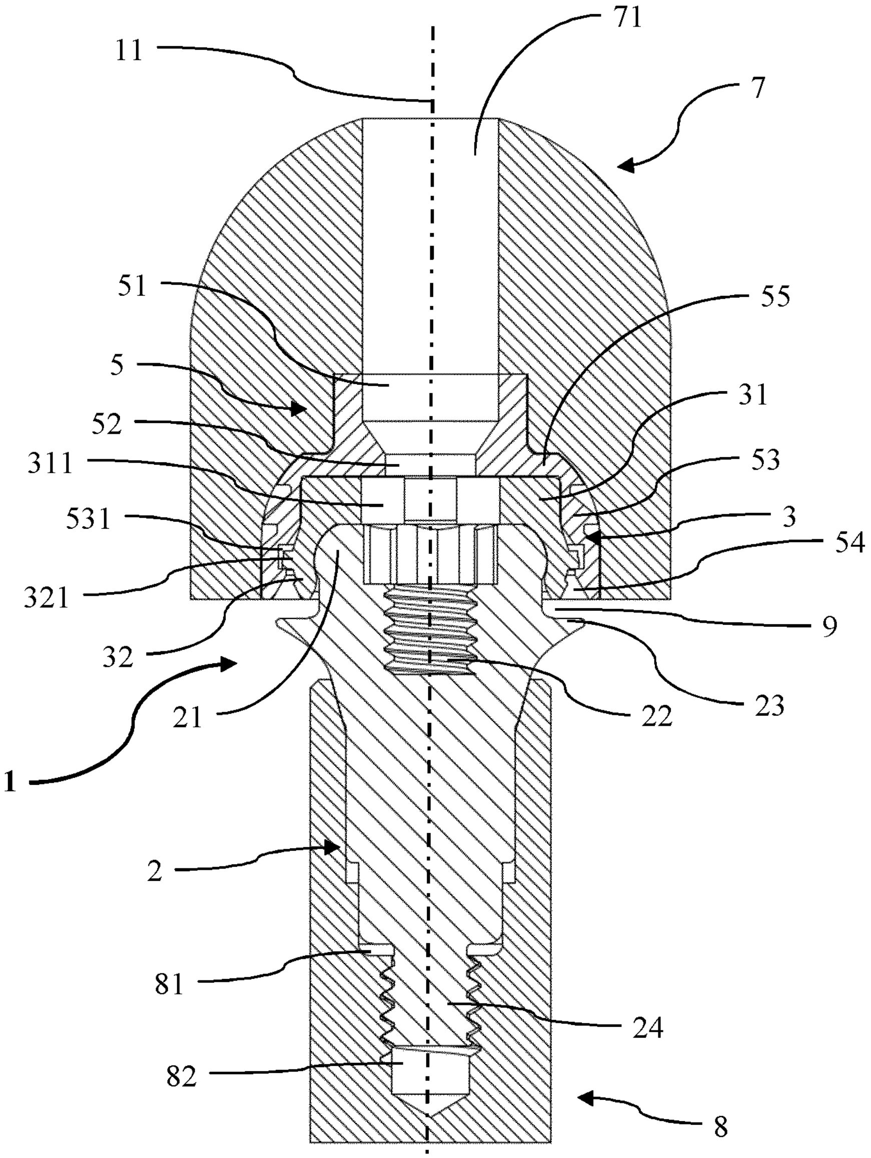
FIG. 2 shows a cross sectional view of the dental connection assembly of FIG. 1, wherein the dental connection assembly is assembled in the hybrid denture composition.

In FIG. 2, the dental connection assembly 1 is shown in its hybrid denture configuration when being assembled or mounted. The abutment 2 is mounted to the implant 8 by screwing the screw post 24 into the screw socket 82. The housing 5 is immovably fixed in the denture cavity 72 of the artificial denture 7. The retention insert 3 is set into the housing cavity 54 of the housing 5 and snap-fit connected to the male member 21 of the abutment 2. In particular, the retention insert 3 together with the housing 5 and the artificial denture 7 is snap-fit to the male member 21 of the abutment 2 by the retention cavity 33 receiving the male member 21. In particular, the retention cavity 33 receives the head portion of the male member 21. Thereby, the retention skirt 32 is slight moved outwardly such that the retention rim 321 is located inside the notch 532. Like this, the retention insert 3 is blocked in the housing 5 when the retention insert 3 is connected to the abutment 2.

The dental connection assembly 1 is configured such that a gap 9 is arranged between the flat top surface of the shoulder portion 23 of the abutment 2 and bottom ends of the housing 5 and the retention insert 3. This allows for a swivelling movement of the artificial denture 7 relative to the abutment 2 to a certain extent such that irregularities and displacements induced by forces applied to the artificial denture can be compensated.

Figure 3:
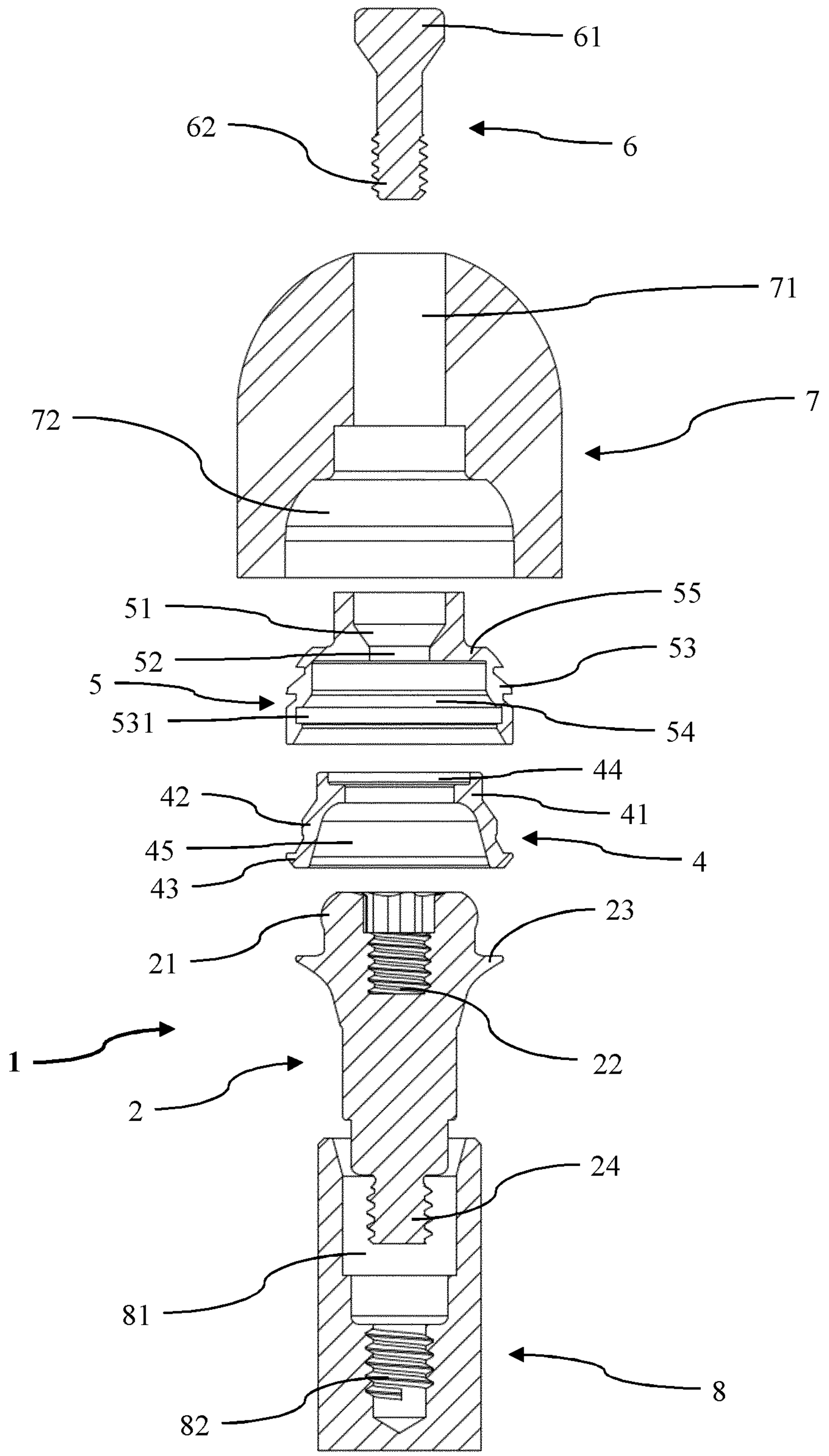
FIG. 3 shows a cross-sectional exploded view of the dental connection assembly of FIG. 1, wherein the dental connection assembly is in a non-removable artificial denture composition.

FIG. 3 shows the dental connection assembly 1 in a non-removable artificial denture configuration. Thereby, the retention insert 3 is replaced by a first embodiment of an intermediate insert 4 according to the invention of the dental replacement part kit. In addition to the artificial denture 7, the housing 5, the abutment 2 and the implant 8, a fixation screw 6 is provided.

The intermediate insert 4 comprises an intermediate end portion 41, an intermediate skirt portion 42, a flange portion 43 and an opening 44. The intermediate end portion 41 and with the intermediate skirt portion 42 together form a female cavity 45 as female recess. More specifically, the intermediate skirt portion 42 has an inner boundary radially limiting the female cavity 45, wherein the inner boundary tapers from the second axial end towards the first axial end. The intermediate end portion 41 is located at a top first axial end of the intermediate skirt portion 42 and radially projects over skirt portion 42 in an inward direction to partially cover the male member 21. The intermediate end portion 41 is provided with the opening 44 that allows the fixation screw 6 to be inserted through the intermediate end portion 41 into the screw socket 22 of the abutment 2 in order to secure the artificial denture 7 and the housing 5 to the abutment 2. The flange portion 43 is situated at a lower second axial end of the intermediate skirt portion 42. It laterally extends in a radial direction.

The fixation screw 6 comprises a head 62 and a post 62. The post 62 is threaded, i.e. it is equipped with an outer thread. The fixation screw 6 is dimensioned to be set up down through the through hole 52 of the housing and the opening 44 of the intermediate insert 4 into the screw socket 22 of the abutment 2 along the main axis 11 (see FIG. 4) of the dental connection assembly 1 in order to fixedly assemble the dental connection assembly 1. The fixation screw 6 is made of a coated or non-coated titanium.

The inner thread of the screw socket 22 of the abutment 2 corresponds to the outer thread of the post 62 of the fixation screw 6. It enables an axial movement of the fixation screw 6 into the screw socket 22 when the fixation screw 6 is rotated in the screw socket 22 about the main axis 11.

Figure 4:
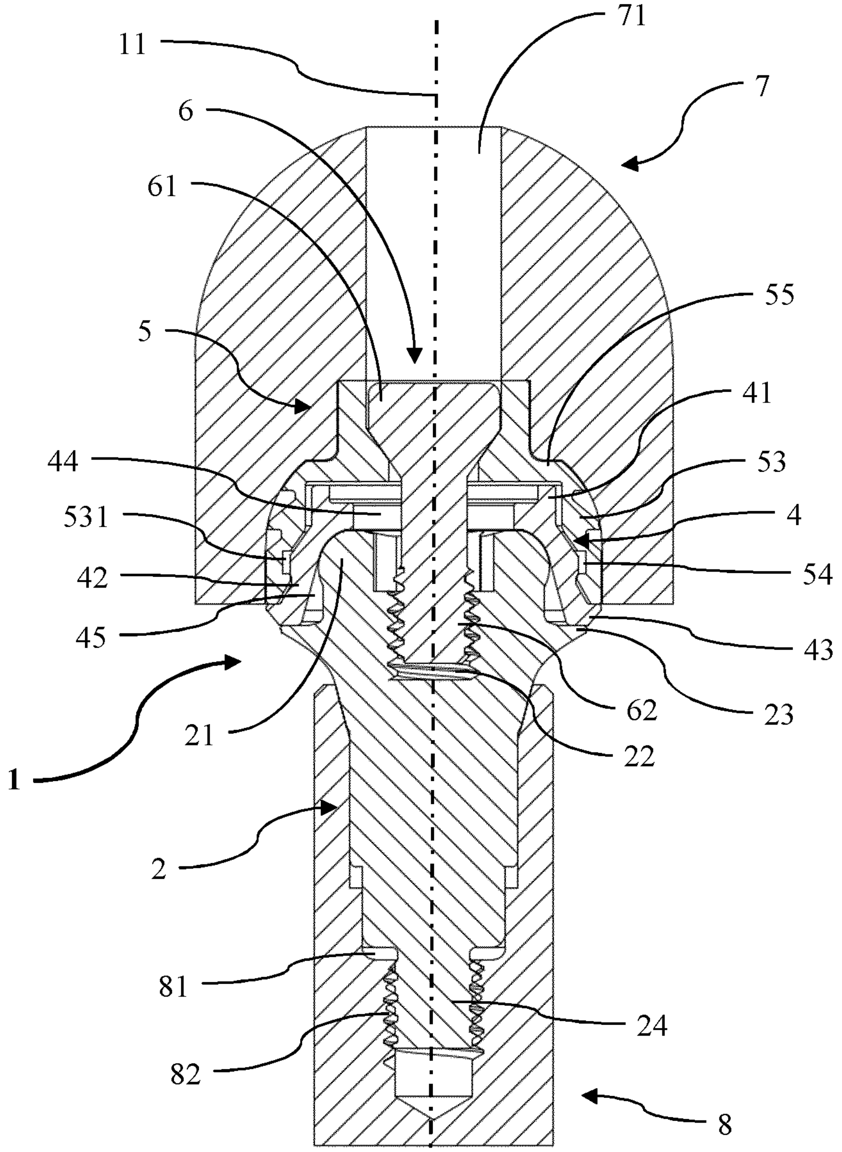
FIG. 4 shows a cross sectional view of the dental connection assembly of FIG. 1, wherein the dental connection assembly is assembled in the non-removable artificial denture composition.

In FIG. 4, the dental connection assembly 1 is shown in its non-removable denture configuration when being assembled or mounted. The intermediate skirt portion 42 of the intermediate insert 4 is positioned inside the housing cavity 54 of the housing 5. Further, the male member 21 of the abutment is received in the female cavity 45 of the intermediate insert 4 such that the intermediate skirt portion 42 is located laterally besides the male member 21. Thus, the female cavity 45 surrounds the male member 21. Thereby, for a convenient handling, the intermediate skirt portion 42 contacts the male member 21 at a lower end of the notch 531 such that the intermediate insert 4 is loosely held in the housing 5, when being arranged in the female cavity 54 but not mounted to the abutment 2. However, the intermediate insert 4 does not provide a retention means for snap-fitting or clamping the intermediate insert 4 to the male member 21 of the abutment 2.

As visible in FIG. 4, when the housing 5 together with the artificial denture 7 and the intermediate insert 4 is fixed to the abutment 2, the fixation screw 6 is screwed into the screw socket 22 of the abutment 2. The head 61 of the fixation screw 6 is positioned in the seat 51 of the housing 5 such that the more the fixation screw is tightened the more the artificial denture 7 is pressed to the abutment 2. The flange portion 43 of the intermediate insert 4 extends into the gap 9 between the housing 5 and the shoulder portion 23. In particular, the flange portion 43 abuts the top surface of the shoulder portion 23 and a bottom end of housing 5 such that it closes the gap 9 between the housing 5 and the shoulder portion 23 of the abutment 2. By tightening the fixation screw 6, the flange portion 23 is clamped between the bottom end of the skirt portion 53 of the housing 5 and the shoulder portion 23 of the abutment 2 such that a seal or tight closure can be achieved such that it can be prevented that impurities enter the space between housing 5 and the male member 21.

Figure 5:
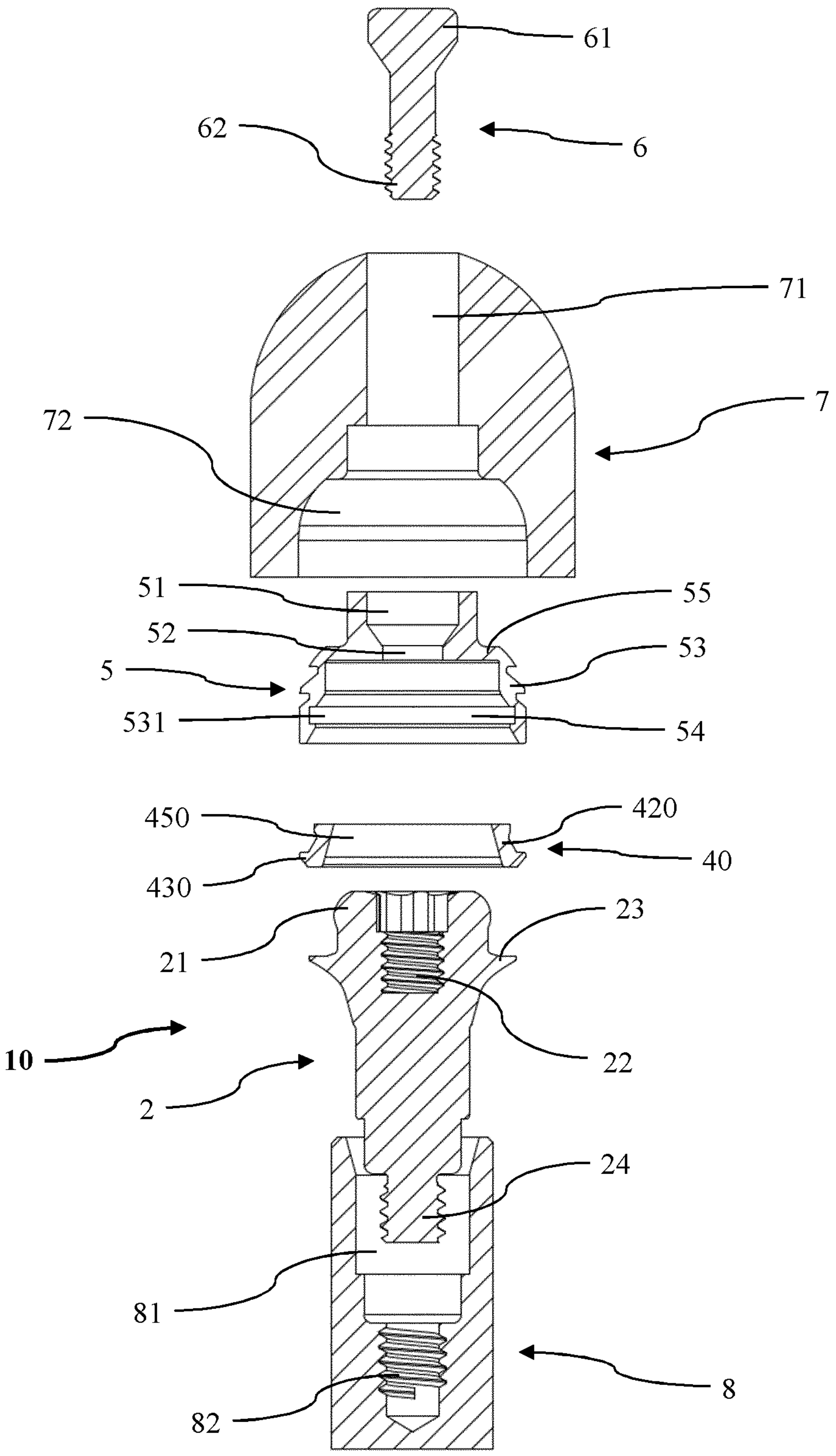
FIG. 5 shows a cross-sectional exploded view of a second embodiment of the dental connection assembly according to the invention comprising a second embodiment of a replacement part kit according to the invention comprising a second embodiment of an intermediate insert according to the invention, wherein the dental connection assembly is in a non-removable artificial denture composition.
Figure 6:
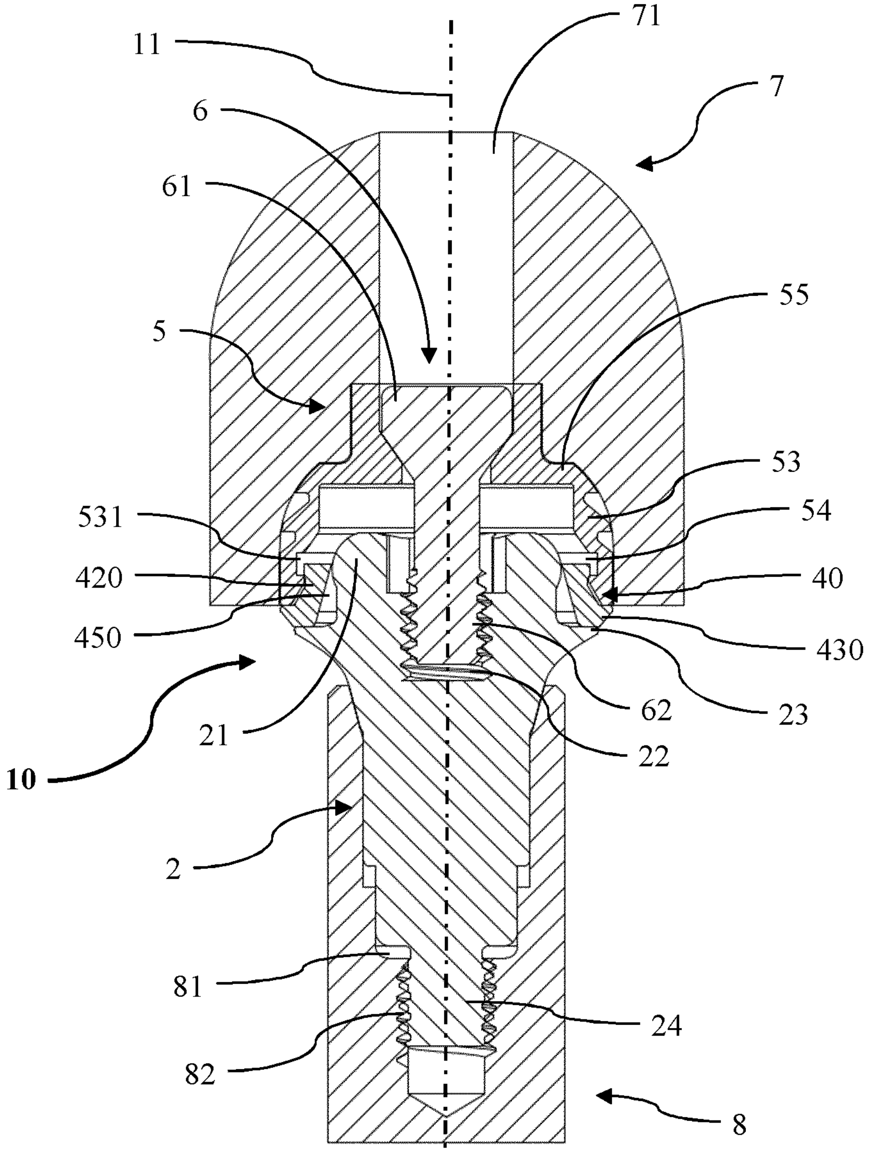
FIG. 6 shows a cross sectional view of the dental connection assembly of FIG. 5, wherein the dental connection assembly is assembled in the non-removable artificial denture composition.

FIG. 5 and FIG. 6 show a second embodiment of a dental connection assembly 10 according to the invention comprising an abutment 2 as abutment structure, a second embodiment of an intermediate insert 40 according to the invention as part of a second embodiment of a dental replacement part kit according to the invention, a housing 5 and a fixation screw 6. FIGS. 5 and 6 shows the dental connection assembly 10 in use together with an artificial denture 7 and an implant 8.

The dental connection assembly 10 comprises the identical abutment 2, fixation screw 6 and housing 5 as the dental connection assembly 1 described above in connection with FIGS. 1 to 4, and is used with the identical artificial denture 7 and implant 8. In fact, unless being described below to be different, structure, application and functioning of the second dental connection assembly 10 is identical to the first dental connection assembly 1 described above.

The intermediate insert 40 comprises an intermediate skirt portion 420 and a flange portion 430. The intermediate skirt portion 420 forms a female recess 450. More specifically, the intermediate skirt portion 420 has an inner boundary radially limiting the female recess 450, wherein the inner boundary tapers from the second axial end towards the first axial end. The flange portion 43 is situated at a lower second axial end of the intermediate skirt portion 42. It laterally extends into a radial direction.

Thus, compared to the cup-like shape of the intermediate insert of the first dental connection assembly 1, the intermediate insert of the second dental connection assembly 10 rather is ring-like shaped as it does not have an intermediate end portion.

Adjacent to the notch 531 the intermediate skirt portion 42 is equipped with a protrusion dimensioned to contact a lower boundary of the notch 531. Like this, the intermediate insert can be loosely held in the housing cavity 54 when the intermediate insert 4 is arranged in the housing 5 but not mounted to the abutment 2. On its lateral periphery, i.e. the side of the housing skirt 53 that faces the artificial denture, the housing skirt 53 provides undercut structures in the form of, e.g., radial projections that built retention means for firm connection to the artificial denture. The housing 5 is made of titanium.

Figure 7:
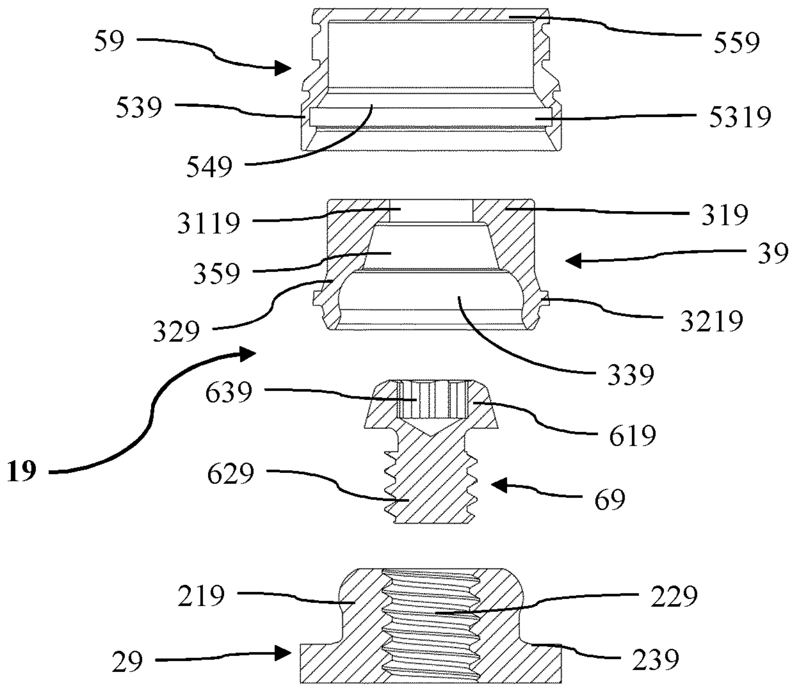
FIG. 7 shows a cross-sectional exploded view of an embodiment of a dental connection assembly having a swivel protection structure.

FIG. 7 shows a dental connection assembly 19 for a hybrid denture comprising an abutment 29, a housing 59, a retention insert 39 and a swivel protection screw 69.

The housing 59 has a housing end portion 559 and a housing skirt 539 together forming a downwardly opening housing cavity 549 that is designed to receive the retention insert 39. Further, the housing skirt portion 539 has a notch 5319 circumferentially extending about the housing cavity 549. On its lateral periphery, the housing skirt 539 is equipped with radial projections that built retention means for a firm connection to an artificial denture.

The retention insert 39 comprises a retention end portion 319 and a retention skirt portion 329 together forming a retention cavity 339. The retention end portion 319 is equipped with an opening 3119 and the retention skirt portion 329 comprises an axial slit extending to the opening 3119, both of them facilitating the generation of a spring like effect to snap-fit connect the retention insert 39 to the abutment 29. The retention skirt portion 329 comprises an outwardly or radially extending retention rim 3219 that forms a radial projection. Towards the opening 3119, the retention cavity 339 forms a swivel protection section 359.

The swivel protection screw 69 has a head 619 equipped with a drive socket 639, and a post 629 equipped with an outer thread. The head 619 essentially has the shape of a truncated cone.

The abutment 29 has a male member 219, a screw socket 229 and a shoulder portion 239. The screw socket 229 provides an axial hole along a main axis 119 (see FIG. 8) of the dental connection assembly 19 and is equipped with an inner thread. The screw socket 229 opens at an upper end of the male member 219.

Figure 8:
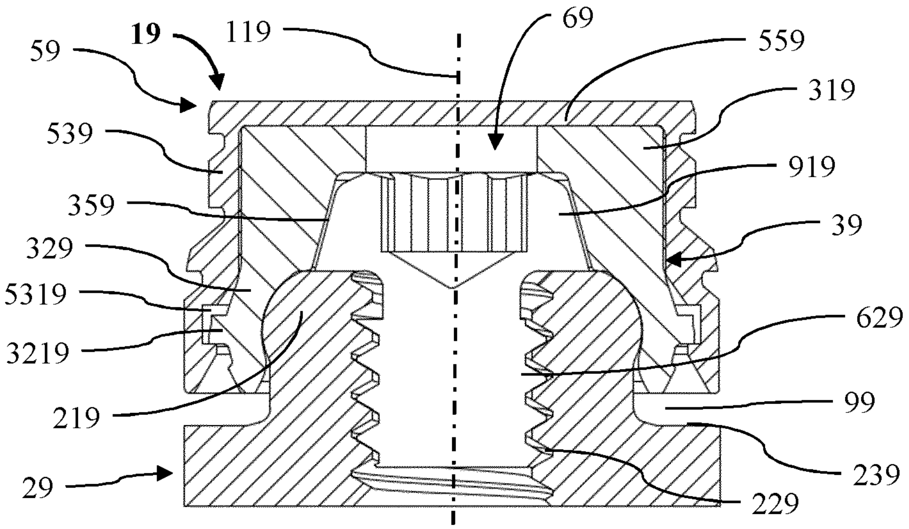
FIG. 8 shows a cross sectional view of the dental connection assembly of FIG. 7 in an assembled state.

In FIG. 8, the dental connection assembly 19 is shown in a mounted or assembled state. Thereby, it can be seen that the swivel protection screw 69 is screwed into the screw socket 229 of the abutment 29 such that the head 619 of the swivel protection screw 69 projects from the male member 219 and forms a swivel protection projection.

The retention insert 39 is set into the housing cavity 549 of the housing 59 and snap-fit connected to the male member 219 of the abutment 29. In particular, the retention insert 39 together with the housing 59 is snap-fit to the male member 219 of the abutment 29 by the retention cavity 339 receiving the male member 219 together with the head 619 of the swivel protection screw 69. Thereby, the retention skirt 329 is slight moved outwardly such that the retention rim 3219 is located inside the notch 5329. Like this, the retention insert 39 is blocked in the housing 59 when the retention insert 39 is connected to the abutment 29.

The head 619 of the swivel protection screw 69 is received in the swivel protection section 359 of the retention cavity 339. In particular, the swivel protection section 359 is shaped in correspondence with the head 619 of the swivel protection screw 69. Like this, an extent of a possible swivelling of the retention insert 39 and, thus, the housing 59 together with the artificial denture is limited.

It is noted that the swivel protection projection formed by the head 619 of the swivel protection screw 69 could also be an integral part of the male member 21 of the abutment 2. Further, even though the dental connection assembly 19 is embodied for exclusively being used in a hybrid denture configuration, it can analogously be embodied for providing both the hybrid denture configuration and the non-removable denture configuration. In particular, the swivel protection structure can conveniently be embodied in the first and/or second dental connection assembly described above or another embodiment of the dental connection assembly according to the invention.

This description and the accompanying drawings that illustrate aspects and embodiments of the present invention should not be taken as limiting-the claims defining the protected invention. In other words, while the invention has been illustrated and described in detail in the drawings and foregoing description, such illustration and description are to be considered illustrative or exemplary and not restrictive. Various mechanical, compositional, structural, electrical, and operational changes may be made without departing from the spirit and scope of this description and the claims. In some instances, well-known circuits, structures and techniques have not been shown in detail in order not to obscure the invention. Thus, it will be understood that changes and modifications may be made by those of ordinary skill within the scope and spirit of the following claims. In particular, the present invention covers further embodiments with any combination of features from different embodiments described above and below.

The disclosure also covers all further features shown in the FIGS. individually although they may not have been described in the afore or following description. Also, single alternatives of the embodiments described in the figures and the description and single alternatives of features thereof can be disclaimed from the subject matter of the invention or from disclosed subject matter. The disclosure comprises subject matter consisting of the features defined in the claims or the exemplary embodiments as well as subject matter comprising said features.

Furthermore, in the claims the word "comprising" does not exclude other elements or steps, and the indefinite article "a" or "an" does not exclude a plurality. A single unit or step may fulfil the functions of several features recited in the claims. The mere fact that certain measures are recited in mutually different dependent claims does not indicate that a combination of these measures cannot be used to advantage. The terms "essentially", "about", "approximately" and the like in connection with an attribute or a value particularly also define exactly the attribute or exactly the value, respectively. The term "about" in the context of a given numerate value or range refers to a value or range that is, e.g., within 20%, within 10%, within 5%, or within 2% of the given value or range. Components described as coupled or connected may be electrically or mechanically directly coupled, or they may be indirectly coupled via one or more intermediate components. Any reference signs in the claims should not be construed as limiting the scope.

The invention claimed is:

1. A dental connection assembly for connecting an artificial denture to a jaw, comprising a retention insert and an abutment structure, wherein the abutment structure has a male member and a shoulder portion positioned apical of the male member and projecting radially beyond the male member, the retention insert has a retention end portion and a retention skirt portion together forming a retention cavity, the retention insert and the abutment structure are configured to be snap-fit connected by the retention cavity of the retention insert receiving the male member of the abutment structure, the dental connection assembly further comprising a fixation screw and an intermediate insert, wherein the abutment structure has a screw socket which opens at the male member and which corresponds to the fixation screw such that the fixation screw is axially movable into the screw socket by screwing the fixation screw into the screw socket, the intermediate insert has an intermediate skirt portion and a flange portion, the intermediate skirt portion of the intermediate insert forms a female recess dimensioned to receive the male member of the abutment structure, the intermediate skirt portion of the intermediate insert has a first axial end and a second axial end, the flange portion outwardly extends from the second axial end of the intermediate skirt portion, and the flange portion of the intermediate insert abuts the shoulder portion of the abutment structure, when the female recess receives the male member of the abutment structure.

2. The dental connection assembly according to claim 1, comprising a housing with a housing cavity, wherein the housing is configured to be fixed to the artificial denture and the housing cavity is configured to receive either the retention insert or the intermediate insert.

3. The dental connection assembly according to claim 2, wherein the retention insert, the abutment structure and the housing are configured to form a gap between the shoulder portion of the abutment structure and both the housing and the retention insert, when the housing cavity of the housing receives the retention insert and the retention cavity of the retention insert receives the male member of the abutment structure.

4. The dental connection assembly according to claim 1, wherein the intermediate insert has an intermediate end portion arranged at the first axial end of the intermediate skirt portion.

5. The dental connection assembly according to claim 4, wherein the intermediate end portion of the intermediate insert has an opening to access the female recess through the intermediate end portion such that the screw socket of the abutment structure is accessible to the fixation screw through the opening of the intermediate end portion of the intermediate insert, when the male member of the abutment structure is received in the female recess of the intermediate insert.

6. The dental connection assembly according to claim 1, wherein the flange portion of the intermediate insert radially extends from the intermediate skirt portion of the intermediate insert.

7. The dental connection assembly according to claim 1, wherein the screw socket of the abutment structure has a main axis about which the fixation screw is rotated when being screwed into the screw socket of the abutment structure.

8. The dental connection assembly according to claim 1, wherein the male member of the abutment structure comprises a swivel protection projection, wherein the retention cavity of the retention insert is shaped to receive the male member of the abutment structure including the swivel protection projection.

9. The dental connection assembly according to claim 8, comprising a swivel protection screw having a head and being configured to be screwed into the screw socket of the abutment structure such that the head of the swivel protection screw projects from the male member, wherein the retention cavity of the retention insert is shaped to receive the male member of the abutment structure together with the head of the swivel protection screw, when the swivel protection screw is screwed into the screw socket of the abutment structure.

10. The dental connection assembly according to claim 9, wherein the retention cavity of the retention insert together with the swivel protection projection of the male member of the abutment structure or together with the head of the swivel protection screw are configured such that swivelling of the retention insert is prevented, when the male member of the abutment structure is received in the retention cavity of the retention insert.

11. The dental connection assembly according to claim 1, wherein the retention insert and the housing cavity of the housing are configured such that the retention insert is locked in the housing cavity when the housing cavity of the housing receives the retention insert and the retention cavity of the retention insert receives the male member of the abutment structure, and the retention insert is reversibly held in the housing cavity when the housing cavity of the housing receives the retention insert and the retention cavity of the retention insert does not receive the male member of the abutment structure.

12. A dental replacement part kit of a dental connection assembly for connecting an artificial denture to a jaw, comprising a retention insert and an intermediate insert, wherein the retention insert has a retention end portion and a retention skirt portion together forming a retention cavity, the retention insert being configured to be snap-fit connected to an abutment structure, by the retention cavity of the retention insert receiving a male member of the abutment structure, the intermediate insert has an intermediate skirt portion and a flange portion, the intermediate skirt portion of the intermediate insert forms a female recess dimensioned to receive the male member of the abutment structure without a snap-fit connection, the intermediate skirt portion of the intermediate insert has a first axial end and a second axial end, the flange portion of the intermediate insert outwardly extends from the second axial end of the intermediate skirt portion of the intermediate insert, and the flange portion of the intermediate insert is configured to abut a shoulder portion of the abutment structure positioned apical of the male member, when the female recess receives the male member of the abutment structure.

13. The dental replacement part kit according to claim 12, wherein the intermediate insert has an intermediate end portion arranged at the first axial end of the intermediate skirt portion.

14. The dental replacement part kit according to claim 13, wherein the intermediate end portion of the intermediate insert at least partially covers the first axial end of the intermediate skirt portion of the intermediate insert.

15. The dental replacement part kit according to claim 12, wherein the flange portion of the intermediate insert radially extends from the intermediate skirt portion of the intermediate insert.

16. The dental replacement part kit according to claim 15, wherein the retention cavity of the retention insert is configured together with a swivel protection projection of the male member of the abutment structure such that swivelling of the retention insert is prevented, when the male member of the abutment structure is received in the retention cavity of the retention insert.

17. A dental connection assembly for connecting an artificial denture to a jaw, comprising an intermediate insert, an abutment structure, and a fixation screw, wherein the abutment structure has a male member and a shoulder portion positioned apical of the male member and projecting radially beyond the male member, the intermediate insert comprising an intermediate skirt portion and a flange portion, wherein the intermediate skirt portion forms a female recess dimensioned to receive the male member of the abutment structure, the intermediate skirt portion has a first axial end and a second axial end, the flange portion is arranged at the second axial end of the intermediate skirt portion, the flange portion outwardly extends from the second axial end of the intermediate skirt portion, the flange portion of the intermediate insert abuts the shoulder portion of the abutment structure, when the female recess receives the male member of the abutment structure, the abutment structure has a screw socket which opens at the male member, the fixation screw comprises a head and a post with an outer thread, and the screw socket comprises an inner thread corresponding to the outer thread of the fixation screw such that the fixation screw is axially movable into the screw socket by screwing the fixation screw into the screw socket.

18. The intermediate insert of claim 17, comprising an intermediate end portion arranged at the first axial end of the intermediate skirt portion.

19. The intermediate insert of claim 18, wherein the intermediate end portion at least partially covers the first axial end of the intermediate skirt portion.

20. The intermediate insert of claim 17, wherein the flange portion of the intermediate insert radially extends from the intermediate skirt portion.

21. The dental connection assembly according to claim 17, further comprising a housing with a housing cavity, wherein the housing is configured to be fixed to the artificial denture and the housing cavity is configured to receive the intermediate insert.

22. The dental connection assembly according to claim 21, wherein the intermediate insert, the abutment structure and the housing are configured such that the flange portion of the intermediate insert fills a gap between the housing and the shoulder portion of the abutment structure, when the housing cavity of the housing receives the intermediate insert and the female recess of the intermediate insert receives the male member of the abutment structure.

23. The dental connection assembly according to claim 17, wherein the intermediate insert has an intermediate end portion arranged at the first axial end of the intermediate skirt portion, the intermediate end portion of the intermediate insert having an opening to access the female recess through the intermediate end portion such that the screw socket of the abutment structure is accessible to the fixation screw through the opening of the intermediate end portion of the intermediate insert, when the male member of the abutment structure is received in the female recess of the intermediate insert.

* * * * *